US012619015B2

(12) United States Patent
Tada

(10) Patent No.: US 12,619,015 B2
(45) Date of Patent: May 5, 2026

(54) METHOD OF MANUFACTURING OPTICAL MEMBER

(71) Applicant: NICHIA CORPORATION, Anan (JP)

(72) Inventor: Takaaki Tada, Itano-gun (JP)

(73) Assignee: NICHIA CORPORATION, Anan (JP)

( * ) Notice: Subject to any disclaimer, the term of this patent is extended or adjusted under 35 U.S.C. 154(b) by 306 days.

(21) Appl. No.: 18/446,592

(22) Filed: Aug. 9, 2023

(65) Prior Publication Data

US 2024/0061159 A1      Feb. 22, 2024

(30) Foreign Application Priority Data

Aug. 18, 2022    (JP) ................................. 2022-130499

(51) Int. Cl.
G02B 5/02            (2006.01)

(52) U.S. Cl.
CPC .......... G02B 5/0268 (2013.01); *G02B 5/0221* (2013.01); *G02B 5/0231* (2013.01)

(58) Field of Classification Search
CPC ... G02B 5/0268; G02B 5/0221; G02B 5/0231
See application file for complete search history.

(56) References Cited

U.S. PATENT DOCUMENTS

| | | | |
|---|---|---|---|
| 11,714,212 B1* | 8/2023 | Gustafson ............. | C23C 16/402 |
| | | | 428/174 |
| 2010/0247758 A1* | 9/2010 | Nakayama ............... | G02B 1/02 |
| | | | 106/287.17 |
| 2015/0111063 A1* | 4/2015 | Khan ..................... | C23C 14/025 |
| | | | 427/419.7 |
| 2015/0175814 A1* | 6/2015 | Aizenberg ........... | C09D 5/1693 |
| | | | 427/2.24 |
| 2020/0240011 A1 | 7/2020 | Kauppinen et al. | |

FOREIGN PATENT DOCUMENTS

| | | |
|---|---|---|
| JP | 2010-254553 A | 11/2010 |
| JP | 2015-114381 A | 6/2015 |
| JP | 2018-106173 A | 7/2018 |
| JP | 2020-537188 A | 12/2020 |

* cited by examiner

*Primary Examiner* — Nathanael R Briggs
(74) *Attorney, Agent, or Firm* — Foley & Lardner LLP

(57)        ABSTRACT
A method of manufacturing an optical member includes forming a first layer on a light transmissive substrate by atomic layer deposition, converting a surface layer of the first layer into a boehmite layer, and forming a second layer by atomic layer deposition so as to cover the boehmite layer. The first layer includes aluminum oxide and has a first thickness. The second layer has a second thickness less than the first thickness.

18 Claims, 8 Drawing Sheets

1

31

31

METHOD OF MANUFACTURING OPTICAL MEMBER

CROSS-REFERENCE TO RELATED APPLICATIONS

This application is based on and claims priority to Japanese Patent Application No. 2022-130499, filed on Aug. 18, 2022, the entire contents of which are incorporated herein by reference.

FIELD

The present disclosure relates to a method of manufacturing an optical member.

BACKGROUND

As a method of manufacturing a member having an antireflection function, a method of forming an aluminum oxide film on a base by atomic layer deposition and subjecting the aluminum oxide film to hydrothermal treatment so as to form a fine uneven structure is proposed in Japanese Patent Publication No. 2015-114381. The fine uneven structure formed by subjecting the aluminum oxide film to hydrothermal treatment is composed of boehmite.

The strength of the fine uneven structure composed of boehmite is low, and thus the fine uneven structure is easily damaged. The fine uneven structure may be damaged by, for example, being rubbed with a finger. Therefore, it is difficult for an optical member having a fine uneven structure as described above to obtain stable optical characteristics.

SUMMARY

According to the present disclosure, it is desirable to provide a method of manufacturing an optical member that can reduce damage to a boehmite layer.

According to an aspect of the present disclosure, a method of manufacturing an optical member includes forming a first layer on a light transmissive substrate by atomic layer deposition, converting a surface layer of the first layer into a boehmite layer, and forming a second layer by the atomic layer deposition so as to cover the boehmite layer. The first layer includes aluminum oxide and has a first thickness. The second layer has a second thickness less than the first thickness.

BRIEF DESCRIPTION OF THE DRAWINGS

Other objects and further features of the present invention will be apparent from the following detailed description when read in conjunction with the accompanying drawings, in which.

DETAILED DESCRIPTION

Figure 1:
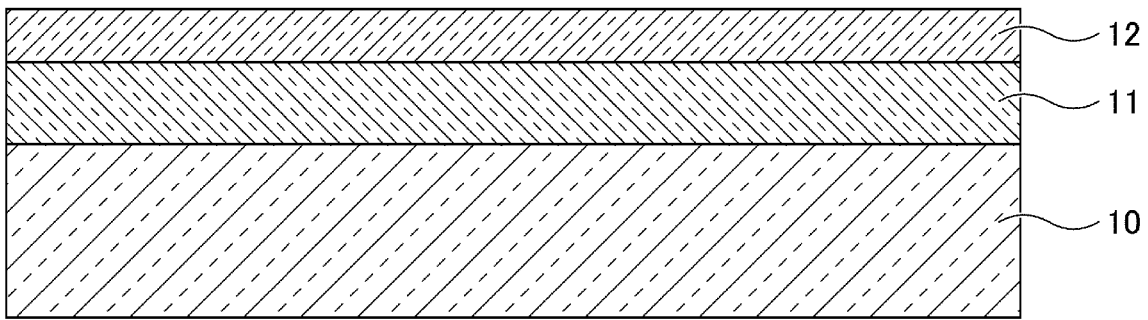
FIG. 1 is a cross-sectional view (part 1) illustrating a method of manufacturing an optical member according to a first embodiment.

Embodiments of the present disclosure will be described below with reference to the accompanying drawings. The following description is provided for the purpose of embodying the technical idea of the present invention, and the present invention is not limited to the embodiments in the following description.

In the drawings, components having the same function may be denoted by the same reference numerals. Although configurations may be illustrated in separate embodiments for the sake of convenience in consideration of ease of explanation or ease of understanding of key points, such configurations illustrated in different embodiments or examples can be partially substituted or combined with one another. A description of an embodiment given after a description of another embodiment will be focused mainly on matters different from those of the already described embodiment, and a duplicate description of matters common to the already described embodiment may be omitted. The sizes, positional relationships, and the like of components illustrated in the drawings may sometimes be exaggerated for clearer illustration.

First Embodiment

A first embodiment will be described. The first embodiment relates to a method of manufacturing an optical member. FIG. 1 through FIG. 4 are cross-sectional views illustrating a method of manufacturing an optical member according to the first embodiment. An optical member 1 according to the first embodiment includes a light transmissive substrate 10, a silicon oxide ($SiO_2$) layer 11, an aluminum oxide layer 12, and a silicon oxide layer 13. Note that the optical member 1 does not necessarily include the silicon oxide layer 11.

In the first embodiment, as illustrated in FIG. 1, first, a step of forming the silicon oxide layer 11, which serves as a third layer, on the light transmissive substrate 10 is performed. The silicon oxide layer 11 can be formed by, for example, sputtering or chemical vapor deposition (CVD). The light transmissive substrate 10 is, for example, a sapphire substrate. The refractive index of sapphire for light with a wavelength of 510 nm is approximately 1.76, and the refractive index of silicon oxide is approximately 1.46. The refractive index of silicon oxide is lower than the refractive index of the sapphire substrate. The thickness of the silicon oxide layer 11 is, for example, 5 nm or more and 100 nm or less. Next, a step of forming the aluminum oxide ($Al_2O_3$) layer 12, which serves as a first layer, on the silicon oxide layer 11 by atomic layer deposition (ALD) is performed. The aluminum oxide layer 12 has a first thickness. The first thickness is, for example, 5 nm or more and 100 nm or less. The refractive index of aluminum oxide for light with a wavelength of 510 nm is approximately 1.65.

Figure 2:
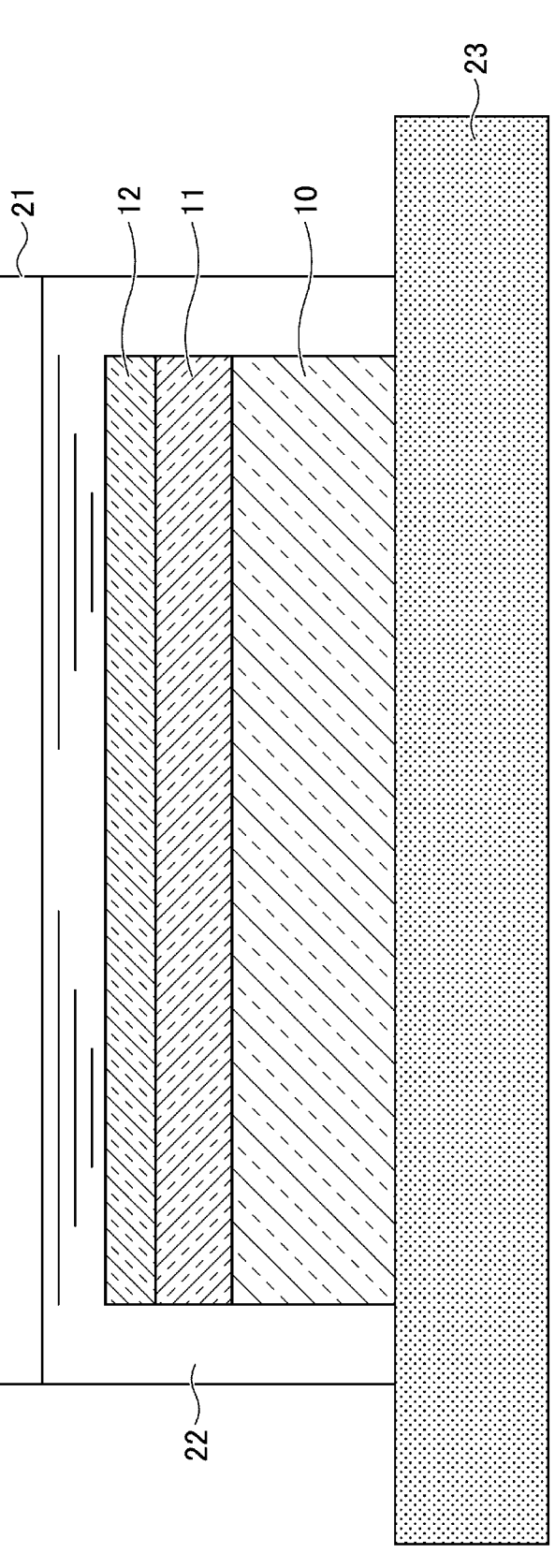
FIG. 2 is a cross-sectional view (part 2) illustrating the method of manufacturing the optical member according to the first embodiment.
Figures 3, 4:
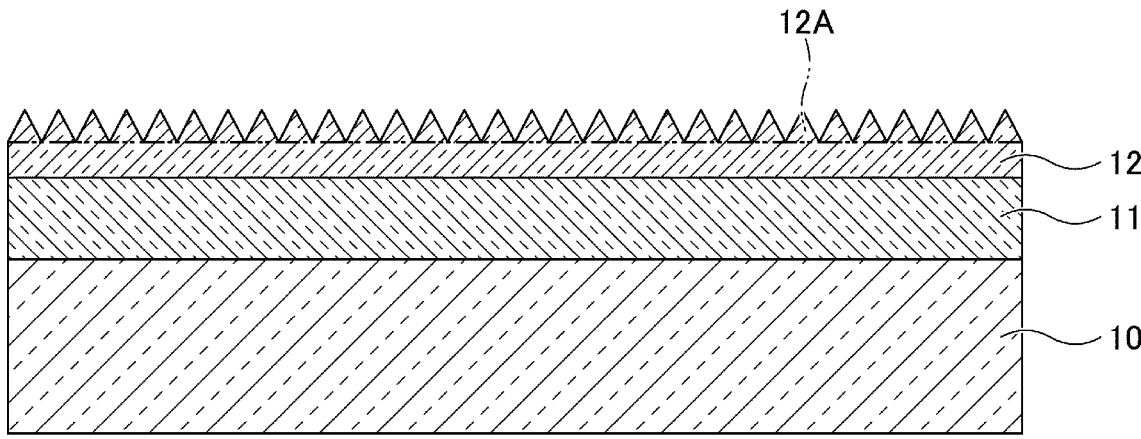
FIG. 3 is a cross-sectional view (part 3) illustrating the method of manufacturing the optical member according to the first embodiment.
FIG. 4 is a cross-sectional view (part 4) illustrating the method of manufacturing the optical member according to the first embodiment.

Next, a step of converting the surface layer of the aluminum oxide layer 12 into a boehmite (AlOOH) layer is performed. Specifically, as illustrated in FIG. 2, a container 21 is placed on a hot plate 23. Then, pure water 22 and a stack of the light transmissive substrate 10, the silicon oxide layer 11, and the aluminum oxide layer 12 are put in the container 21 such that the surface of the aluminum oxide layer 12 is covered by the pure water 22. The pure water 22 is then heated by the hot plate 23. At this time, for example, the temperature of the pure water 22 is 70° C. or more and the heating time is 1 minute or more. That is, the aluminum oxide layer 12 is immersed in the water having a temperature of 70° C. or more for 1 minute or more. As a result of hot water immersion treatment as described above, at least the surface layer of the aluminum oxide layer 12 is converted into the boehmite layer 12A as illustrated in FIG. 3. Note that the entire aluminum oxide layer 12 may be converted into the boehmite layer 12A. The refractive index of boehmite for light with a wavelength of 510 nm is approximately 1.1 or more and 1.2 or less. The refractive index of boehmite is lower than the refractive index of silicon oxide.

Next, as illustrated in FIG. 4, a step of forming the silicon oxide ($SiO_2$) layer 13, which serves as a second layer, by ALD so as to cover the boehmite layer 12A is performed. The silicon oxide layer 13 has a second thickness that is less than the first thickness. The second thickness is, for example, 4 nm or more and 15 nm or less.

In this manner, the optical member 1 can be manufactured.

In the first embodiment, the silicon oxide layer 13 serves as a protective layer for the boehmite layer 12A, and protects the boehmite layer 12A from an external force. Accordingly, damage to the boehmite layer 12A can be reduced. Although the surface of the boehmite layer 12A has a complicated uneven shape, the surface of the entire boehmite layer 12A can be easily covered by the silicon oxide layer 13 because the silicon oxide layer 13 is formed by ALD. Accordingly, the boehmite layer 12A can be securely protected.

Figure 5:
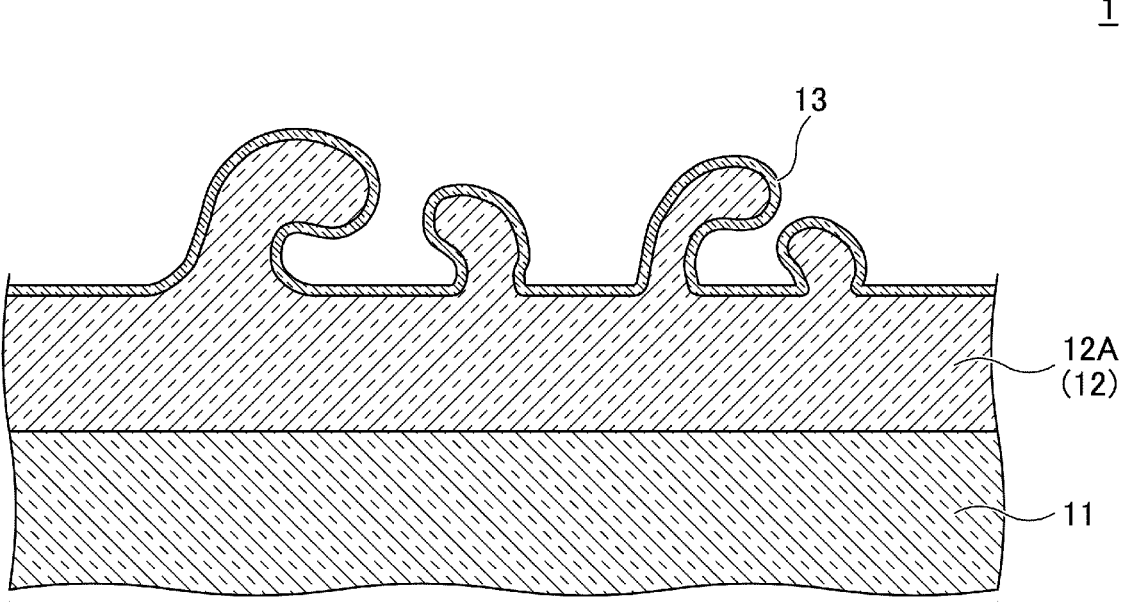
FIG. 5 is a schematic view illustrating an example of the shape of the surface of a boehmite layer.

FIG. 5 is a schematic view illustrating an example of the shape of the surface of the boehmite layer 12A. In the example illustrated in FIG. 5, the entire aluminum oxide layer 12 is converted into the boehmite layer 12A. The surface of the aluminum oxide layer 12 is approximately flat. Conversely, the surface of the boehmite layer 12A is randomly roughened as illustrated in FIG. 5. Thus, the surface of the boehmite layer 12A not only has upward-facing portions, but also side-facing portions and downward-facing portions. When the silicon oxide layer 13 is formed by ALD, the silicon oxide layer 13 can be easily formed on the side-facing portions and the downward-facing portions of the surface of the boehmite layer 12A. Accordingly, the entire surface of the boehmite layer 12A can be easily covered by the silicon oxide layer 13.

Figure 6:
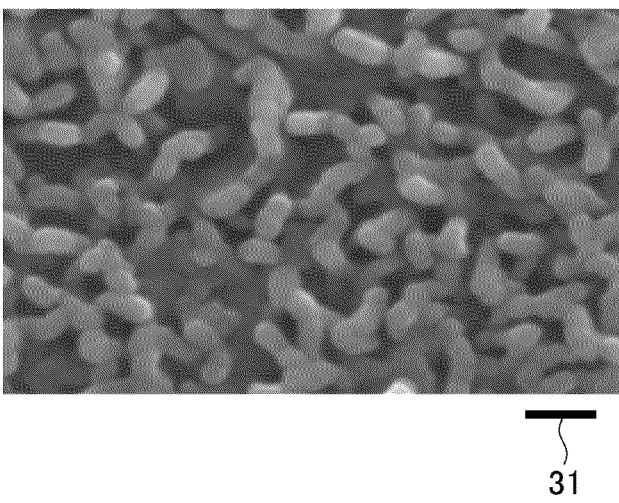
FIG. 6 is a drawing illustrating an example of a scanning electron microscope image of the surface of the boehmite layer.
Figure 7:
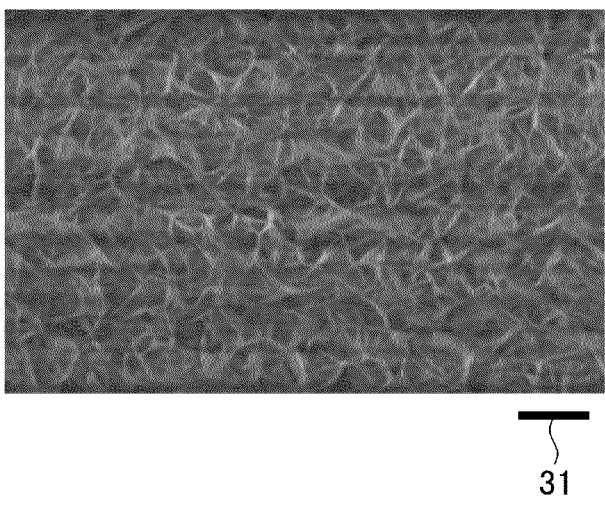
FIG. 7 is a drawing illustrating an example of a scanning electron microscope image of the surface of a silicon oxide layer.

FIG. 6 is a drawing illustrating an example of a scanning electron microscope image of the surface of the boehmite layer 12A. FIG. 7 is a drawing illustrating an example of a scanning electron microscope image of the surface of the silicon oxide layer 13 formed on the surface of the boehmite layer 12A. The magnifications of the images in FIG. 6 and FIG. 7 are equal, and scale bars 31 in FIG. 6 and FIG. 7 represent the same length. As illustrated in FIG. 6, the surface of the boehmite layer 12A has a complicated uneven shape. As illustrated in FIG. 7, the surface of the silicon oxide layer 13 also has a complicated uneven shape. This is presumably because the silicon oxide layer 13, formed by ALD, is shaped to conform to the complicated uneven shape of the boehmite layer 12A so as to cover the entire surface of the boehmite layer 12A.

Second Embodiment

Figure 8:
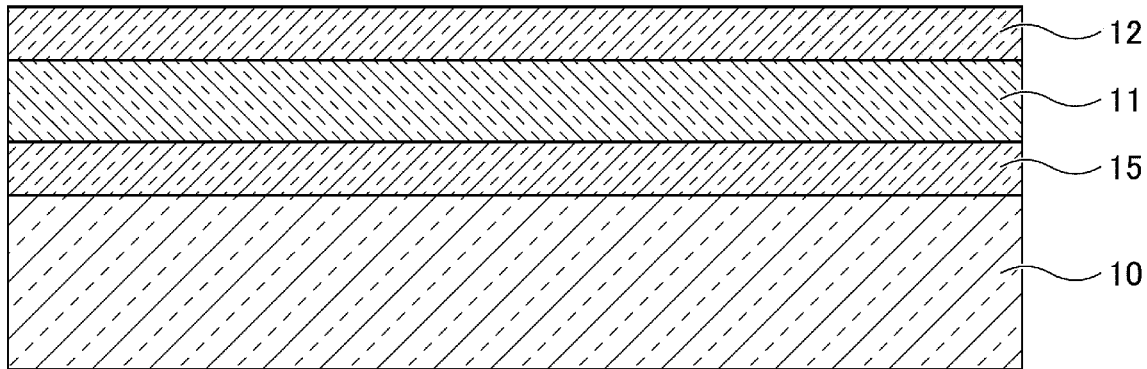
FIG. 8 is a cross-sectional view (part 1) illustrating a method of manufacturing an optical member according to a second embodiment.
Figure 9:
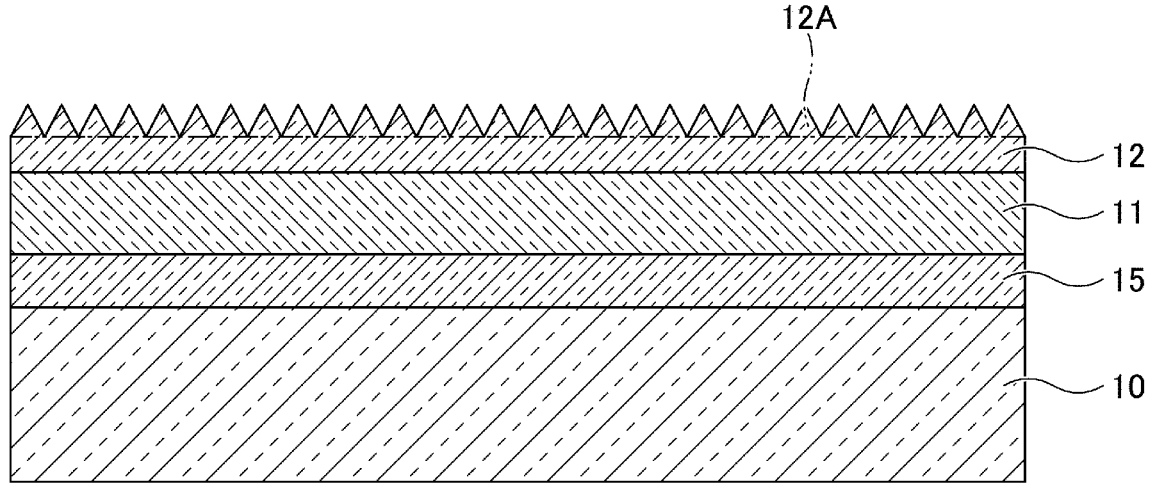
FIG. 9 is a cross-sectional view (part 2) illustrating the method of manufacturing the optical member according to the second embodiment.
Figure 10:
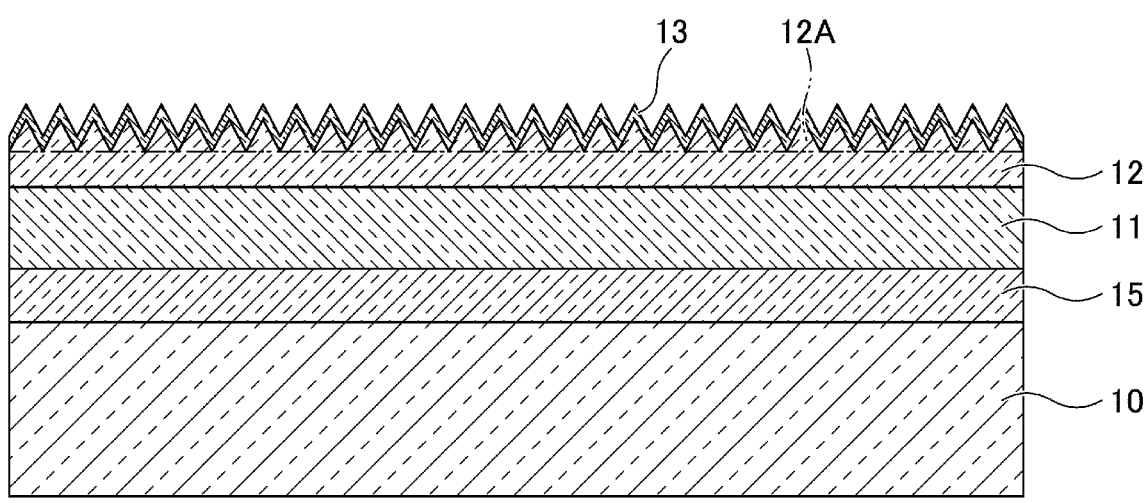
FIG. 10 is a cross-sectional view (part 3) illustrating the method of manufacturing the optical member according to the second embodiment.

A second embodiment will be described. The second embodiment relates to a method of manufacturing an optical member. FIG. 8 through FIG. 10 are cross-sectional views illustrating a method of manufacturing an optical member according to the second embodiment.

In the second embodiment, as illustrated in FIG. 8, first, a step of forming an aluminum oxide ($Al_2O_3$) layer 15, which serves as a fourth layer, on the light transmissive substrate 10 is performed. The aluminum oxide layer 15 can be formed by, for example, ALD, sputtering, or CVD. The thickness of the aluminum oxide layer 15 is, for example, 30 nm or more and 50 nm or less. Next, a step of forming the silicon oxide layer 11, which serves as the third layer, on the aluminum oxide layer 15 is performed. Next, a step of forming the aluminum oxide layer 12, which serves as the first layer, on the silicon oxide layer 11 by ALD is performed.

Next, as illustrated in FIG. 9, a step of converting the surface layer of the aluminum oxide layer 12 into the boehmite layer 12A is performed. In this step, similar to the first embodiment, hot water immersion treatment is performed (see FIG. 2). Next, as illustrated in FIG. 10, a step of forming the silicon oxide layer 13, which serves as the second layer, by ALD so as to cover the boehmite layer 12A is performed.

In this manner, an optical member 2 can be manufactured.

The second embodiment can obtain the same effects as those of the first embodiment. Because the aluminum oxide layer 15 is formed, the refractive index of the entire optical member 2 can be more finely adjusted.

Note that the method of forming the boehmite layer 12A is not limited to hot water immersion treatment. For example, the boehmite layer 12A may be formed by heating the aluminum oxide layer 12 in an atmosphere containing water vapor.

Further, the second layer is not limited to the silicon oxide layer. The second layer may include at least one selected from the group consisting of silicon oxide, aluminum oxide, niobium pentoxide, tantalum pentoxide, hafnium oxide, zirconium oxide, titanium oxide, and zinc oxide.

Figure 11:
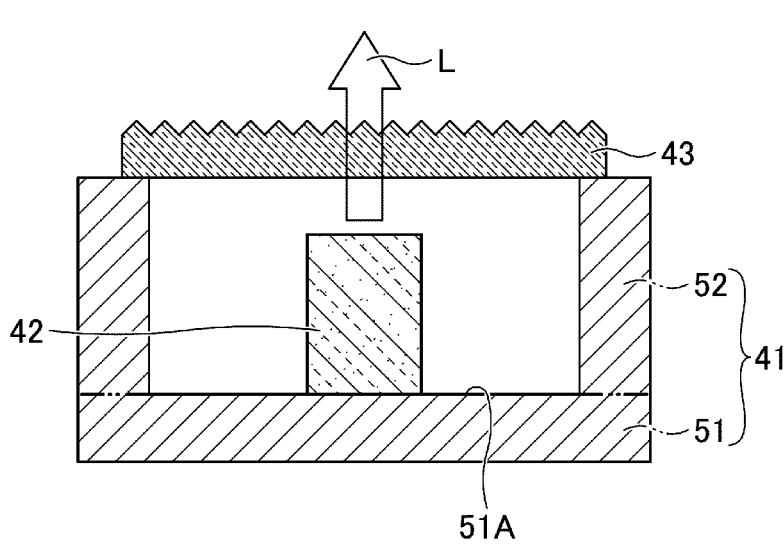
FIG. 11 is a drawing illustrating an example of a light emitting device including an optical member.

A light emitting device including an optical member will be described. FIG. 11 is a drawing illustrating an example of a light emitting device including an optical member.

As illustrated in FIG. 11, a light emitting device 40 includes a base 41, a light emitting element 42, and an optical member 43. The base 41 includes a bottom part 51 and a wall part 52. The light emitting element 42 is disposed on one surface 51A of the bottom part 51 of the base 41. The wall part 52 is disposed on the surface 51A of the base 41 and surrounds the light emitting element 42. The bottom part 51 and the wall part 52 are integrated. The height of the wall part 52 is greater than the height of the light emitting element 42 as measured from the surface 51A. The light emitting element 42 is, for example, a light emitting diode configured to emit ultraviolet light. The base 41 can be formed of, for example, aluminum nitride.

The optical member 43 is the optical member 1 of the first embodiment or the optical member 2 of the second embodiment. The optical member 43 is fixed to the upper surface of the wall part 52, such that the light transmissive substrate 10 faces the light emitting element 42 and the silicon oxide layer 13 is located outside the light emitting device 40. Light L emitted from the light emitting element 42, which is a light source, is transmitted through the optical member 43.

Next, a first test with respect to the strength of each of the optical members and a second test with respect to the optical performance of each of the optical members, conducted by the inventor of the present application, will be described.

(First Test)

In the first test, five optical member samples were produced. Silicon oxide layers each having a thickness of 52.5 nm were formed on respective sapphire substrates, and aluminum oxide layers each having a thickness of 17.5 nm were formed on the respective silicon oxide layers by ALD. Then, the surface layers of the aluminum oxide layers were converted into boehmite layers by immersion treatment in boiled pure water for 5 minutes. Next, silicon oxide layers having different thicknesses were formed by ALD so as to cover the respective boehmite layers. In this manner, the samples were produced. When the silicon oxide layers were formed by ALD, the number of deposition cycles was set to 25 cycles, 50 cycles, 75 cycles, 100 cycles, and 150 cycles for the respective samples. The silicon oxide layers formed after 25, 50, 75, 100, and 150 deposition cycles had thicknesses of approximately 0.7 nm, 4.2 nm, 6.7 nm, 9.2 nm, and 14.5 nm, respectively.

Figure 12:
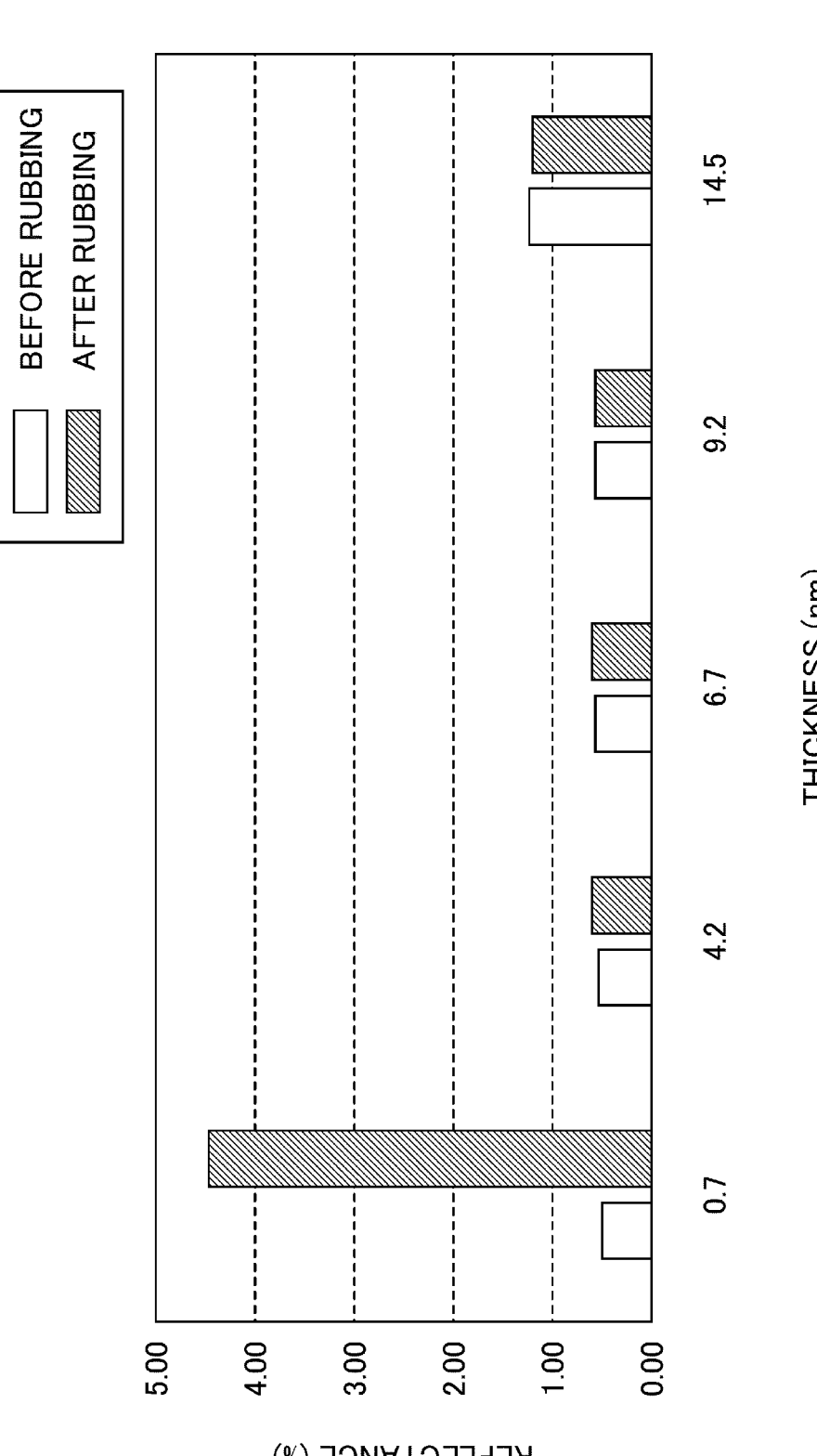
FIG. 12 is a graph illustrating the relationship between the thickness of each silicon oxide layer and the reflectance.

After the silicon oxide layers were formed, the reflectance of each of the samples was measured. Next, the surface of each of the silicon oxide layers was subjected to 10 double rubs, and subsequently, the reflectance of each of the samples was measured. FIG. 12 is a graph illustrating the relationship between the thickness of each of the silicon oxide layers on the aluminum oxide layers and the reflectance. In FIG. 12, the horizontal axis represents the thickness (second thickness) of each of the silicon oxide layers (second layers) on the aluminum oxide layers, and the vertical axis represents the reflectance. In the first test, the strength was evaluated by changing the number of rubs performed on each of the silicon oxide layers. However, the strength may be evaluated by using a nanoindentation test, a scratch test, a friction and wear test, or the like.

As illustrated in FIG. 12, when the thicknesses of silicon oxide layers were 4.2 nm or more, changes in reflectance before and after rubbing were small. The results indicate that particularly excellent strength was obtained when the thicknesses of the silicon oxide layers were 4.2 nm or more. When the thicknesses of silicon oxide layers were 4.2 nm or more and 9.2 nm or less, the reflectance was particularly low. The results indicate that, when the thicknesses of the silicon oxide layers were 4.2 nm or more and 9.2 nm or less, optical members having high strength and low reflectance were obtained.

According to the results of the first test, the second thickness of a silicon oxide layer, serving as the second layer, is preferably 4 nm or more and 15 nm or less, and more preferably 4 nm or more and 10 nm or less. Further, the first thickness of an aluminum oxide layer, serving as the first layer, can be appropriately selected in accordance with the application of an optical member, for example, in accordance with the wavelength of light that is transmitted through the optical member.

Note that, when the inventor of the present application formed a silicon oxide layer by sputtering so as to cover a boehmite layer, the strength was not improved as compared to when a silicon oxide layer was formed by ALD. This was presumably because, when the silicon oxide layer was formed by sputtering, large portions of the surface of the boehmite layer having a complicated uneven structure remained uncovered by the silicon oxide layer due to a high degree of straightness of the raw material.

(Second Test)

In the second test, optical member samples A, B, and C were produced as follows.

In the sample A, a silicon oxide layer having a thickness of 52.0 nm was formed on a sapphire substrate.

In the sample B, a silicon oxide layer having a thickness of 52.5 nm was formed on a sapphire substrate, an aluminum oxide layer having a thickness of 85.3 nm was formed on the silicon oxide layer by ALD, and the aluminum oxide layer was converted into a boehmite layer by hot water immersion treatment.

In the sample C, an aluminum oxide layer having a thickness of 39.1 nm was formed on a sapphire substrate, a silicon oxide layer having a thickness of 10.0 nm was formed on the aluminum oxide layer, an aluminum oxide layer having a thickness of 8.8 nm was formed on the silicon oxide layer by ALD, and the aluminum oxide layer was converted into a boehmite layer by hot water immersion treatment. Next, a silicon oxide layer having a thickness of 5.0 nm was formed by ALD so as to cover the boehmite layer.

A light source was disposed to face the sapphire substrate of each of the optical member samples, and a radiant flux of light emitted from the light source and passing through each of the samples was measured.

The radiant flux of the sample B that includes the boehmite layer was approximately 1.3% higher than the radiant flux of the sample A that does not include a boehmite layer. The radiant flux of the sample C that includes, in addition to the boehmite layer, the silicon oxide layer covering the boehmite layer was approximately 1.4% higher than the radiant flux of the sample A. The radiant flux of the sample C was almost equal to the radiant flux of the sample B. The results indicate that the optical performance, obtained when the silicon oxide layer covering the boehmite layer was provided, was substantially equivalent to the optical performance obtained when no silicon oxide layer covering the boehmite layer was provided.

According to the present disclosure, a method of manufacturing an optical member that can reduce damage to a boehmite layer can be provided.

Although embodiments and the like have been described in detail above, the above-described embodiments and the like are non-limiting examples, and various modifications and substitutions can be made to the above-described embodiments and the like without departing from the scope recited in the claims.

What is claimed is:

1. A method of manufacturing an optical member, the method comprising:
    forming a first layer on a light transmissive substrate by atomic layer deposition, the first layer comprising aluminum oxide and having a first thickness;
    converting a surface layer of the first layer into a boehmite layer; and after converting the surface layer of the first layer into the boehmite layer, forming a second layer on the boehmite layer by atomic layer deposition such that the second layer covers the boehmite layer and forms an outermost layer of the optical member, the second layer having a second thickness less than the first thickness.

2. The method of manufacturing the optical member according to claim 1, wherein:

the step of converting of the surface layer of the first layer into the boehmite layer comprises immersing the first layer in water having a temperature of 70° C. or more.

3. The method of manufacturing the optical member according to claim 1, further comprising:

before the step of forming the first layer, forming a third layer on the light transmissive substrate; wherein:

the first layer is formed on the third layer; and a refractive index of the third layer is lower than a refractive index of the light transmissive substrate and is higher than a refractive index of the boehmite layer.

4. The method of manufacturing the optical member according to claim 2, further comprising:

before the step of forming the first layer, forming a third layer on the light transmissive substrate; wherein:

the first layer is formed on the third layer; and a refractive index of the third layer is lower than a refractive index of the light transmissive substrate and is higher than a refractive index of the boehmite layer.

5. The method of manufacturing the optical member according to claim 3, further comprising:

before the step of forming the third layer, forming a fourth layer on the light transmissive substrate, the fourth layer comprising aluminum oxide; wherein:

the third layer is formed on the fourth layer.

6. The method of manufacturing the optical member according to claim 4, further comprising:

before the step of forming the third layer, forming a fourth layer on the light transmissive substrate, the fourth layer comprising aluminum oxide; wherein:

the third layer is formed on the fourth layer.

7. The method of manufacturing the optical member according to claim 1, wherein:

the first thickness is 5 nm or more and 17.5 nm or less.

8. The method of manufacturing the optical member according to claim 2, wherein:

the first thickness is 5 nm or more and 17.5 nm or less.

9. The method of manufacturing the optical member according to claim 3, wherein:

the first thickness is 5 nm or more and 17.5 nm or less.

10. The method of manufacturing the optical member according to claim 1, wherein:

the second thickness is 4 nm or more and 15 nm or less.

11. The method of manufacturing the optical member according to claim 2, wherein:

the second thickness is 4 nm or more and 15 nm or less.

12. The method of manufacturing the optical member according to claim 3, wherein:

the second thickness is 4 nm or more and 15 nm or less.

13. The method of manufacturing the optical member according to claim 1, wherein:

the second layer comprises at least one of silicon oxide, aluminum oxide, niobium pentoxide, tantalum pentoxide, hafnium oxide, zirconium oxide, titanium oxide, or zinc oxide.

14. The method of manufacturing the optical member according to claim 2, wherein:

the second layer comprises at least one of silicon oxide, aluminum oxide, niobium pentoxide, tantalum pentoxide, hafnium oxide, zirconium oxide, titanium oxide, or zinc oxide.

15. The method of manufacturing the optical member according to claim 3, wherein:

the second layer comprises at least one of silicon oxide, aluminum oxide, niobium pentoxide, tantalum pentoxide, hafnium oxide, zirconium oxide, titanium oxide, or zinc oxide.

16. The method of manufacturing the optical member according to claim 1, wherein:

the light transmissive substrate is a sapphire substrate.

17. The method of manufacturing the optical member according to claim 2, wherein:

the light transmissive substrate is a sapphire substrate.

18. The method of manufacturing the optical member according to claim 3, wherein:

the light transmissive substrate is a sapphire substrate.

* * * * *